United States Patent
Raso et al.

[11] 3,771,719
[45] Nov. 13, 1973

[54] WHEEL MODULES FOR OVERHEAD TRACKING SPRINKLER SYSTEM

[75] Inventors: Vito Raso, Buena Park; George R. Blackmore, Los Alamitos, both of Calif.

[73] Assignee: Emerson Electric Co., St. Louis, Mo.

[22] Filed: Apr. 9, 1971

[21] Appl. No.: 132,679

[52] U.S. Cl.................. 239/177, 239/212, 137/344, 180/65 F
[51] Int. Cl............................ B05b 3/12, B60k 1/02
[58] Field of Search.................... 239/212, 213, 177; 137/344; 180/65 F

[56] References Cited
UNITED STATES PATENTS

| | | | |
|---|---|---|---|
| 3,623,662 | 11/1971 | Reinke | 239/213 X |
| 3,662,776 | 5/1972 | Bryant et al. | 239/213 X |
| 2,860,007 | 11/1958 | Cornelius | 137/344 |
| 1,313,937 | 8/1919 | Brinton | 180/65 F |
| 2,327,583 | 8/1943 | Framheim | 180/65 R |
| 3,587,763 | 6/1971 | Kinkead | 137/344 X |
| 3,583,639 | 6/1971 | Cornelius | 239/212 |
| 2,628,863 | 2/1953 | Maggart | 239/212 X |
| 2,729,298 | 1/1956 | Tourneau | 180/65 F |
| 3,186,506 | 6/1965 | Leach et al. | 180/65 F |
| 3,265,147 | 8/1966 | Coordes | 180/65 F |
| 3,163,250 | 12/1964 | Gibson | 180/65 F |
| 3,268,058 | 8/1966 | Buckeridge et al. | 180/65 R |

FOREIGN PATENTS OR APPLICATIONS

| | | | |
|---|---|---|---|
| 291,021 | 7/1967 | Australia | 239/177 |

*Primary Examiner*—Robert S. Ward, Jr.
*Attorney*—Flam and Flam

[57] ABSTRACT

A horizontal sprinkler beam is supported by a plurality of ground tracking units. Each ground tracking unit includes two individual wheel modules. Various interchangeable wheel modules make possible various combinations for each ground tracking unit—simple gear motors, variable ratio drives, gear reduction mechanisms having provisions for connection to the companion drive module, and coasters. Each drive and gear module may be provided with a quick disconnect device to permit towing. Moreover, if the beam tracks circularly, each module may be provided with means for turning the wheel axes 90° whereby the towing may be endwise.

11 Claims, 14 Drawing Figures

PATENTED NOV 13 1973

VITO RASO
GEORGE R. BLACKMORE
INVENTORS.

BY
Flam and Flam
ATTORNEYS.

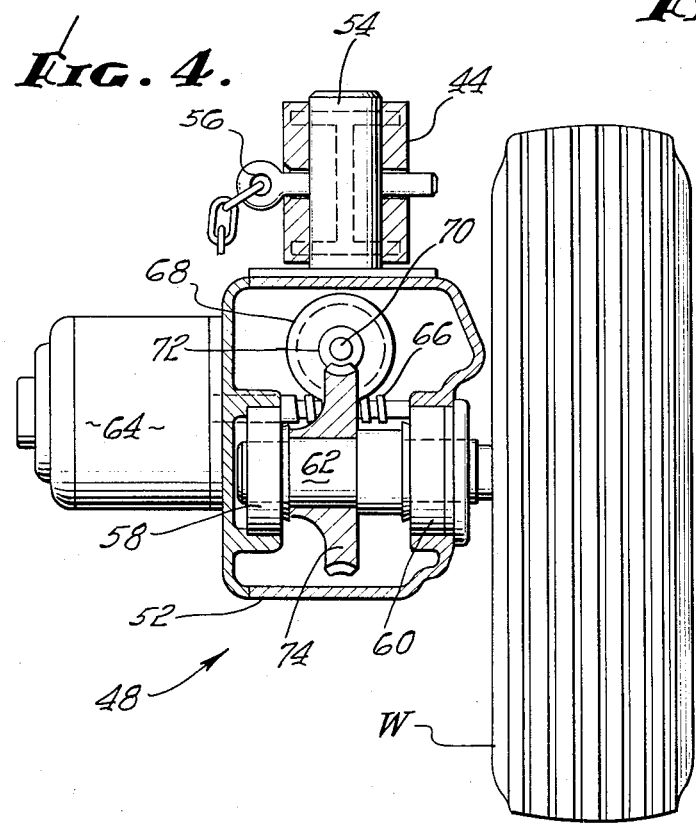
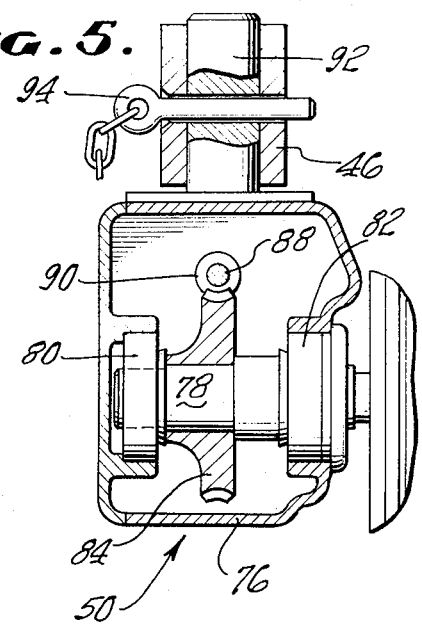
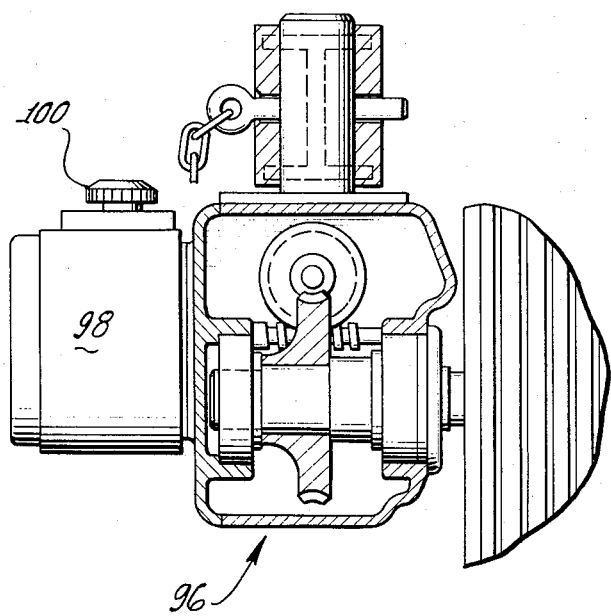

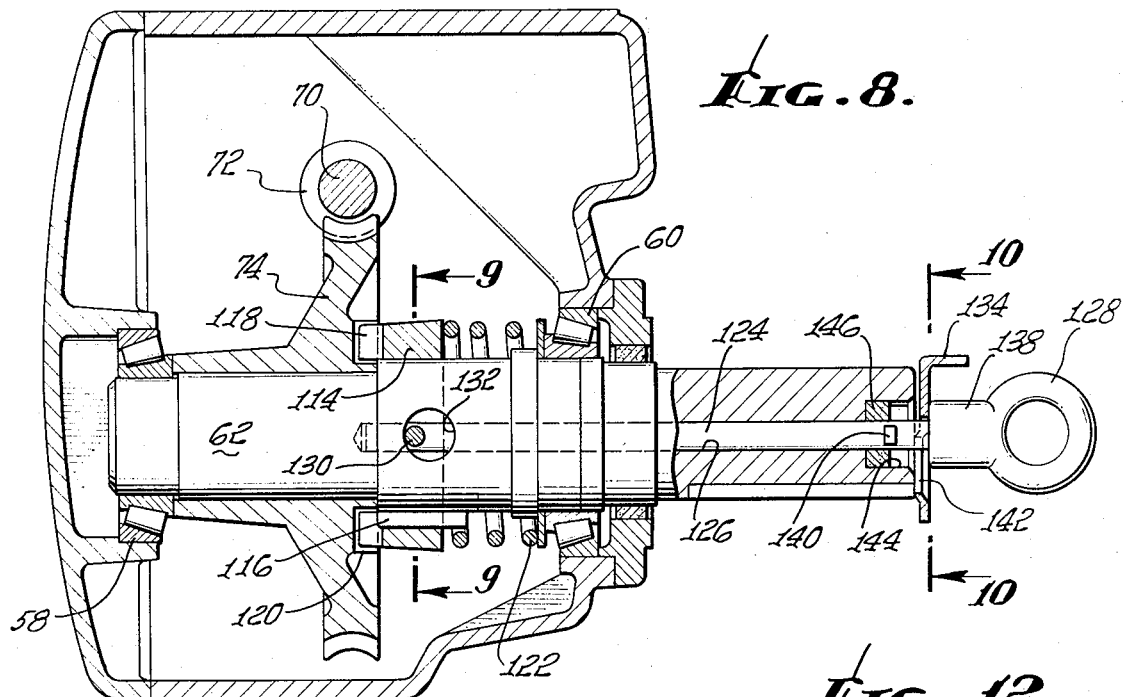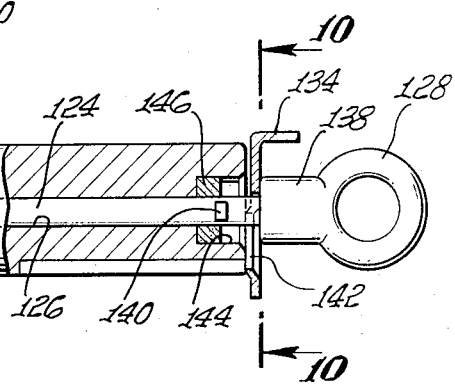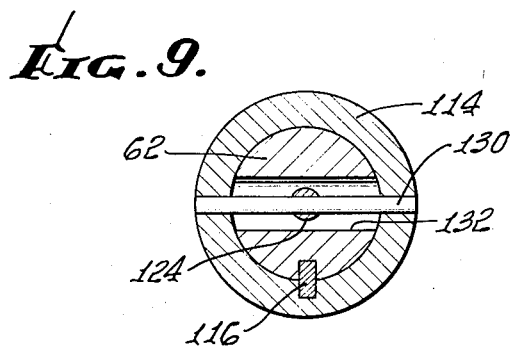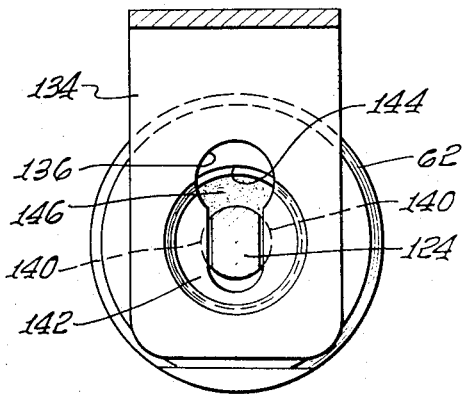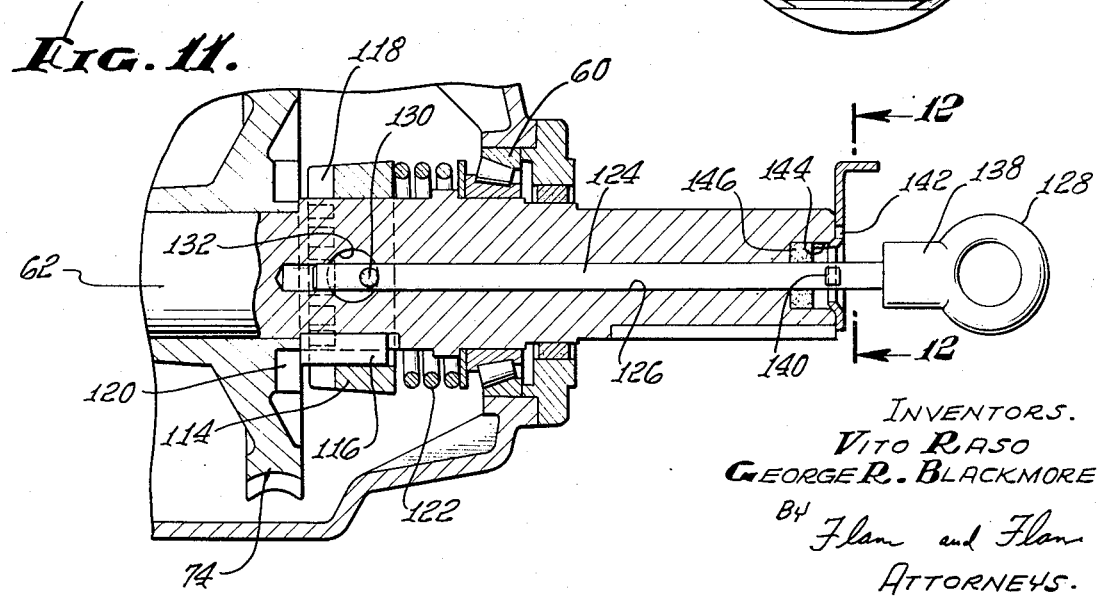

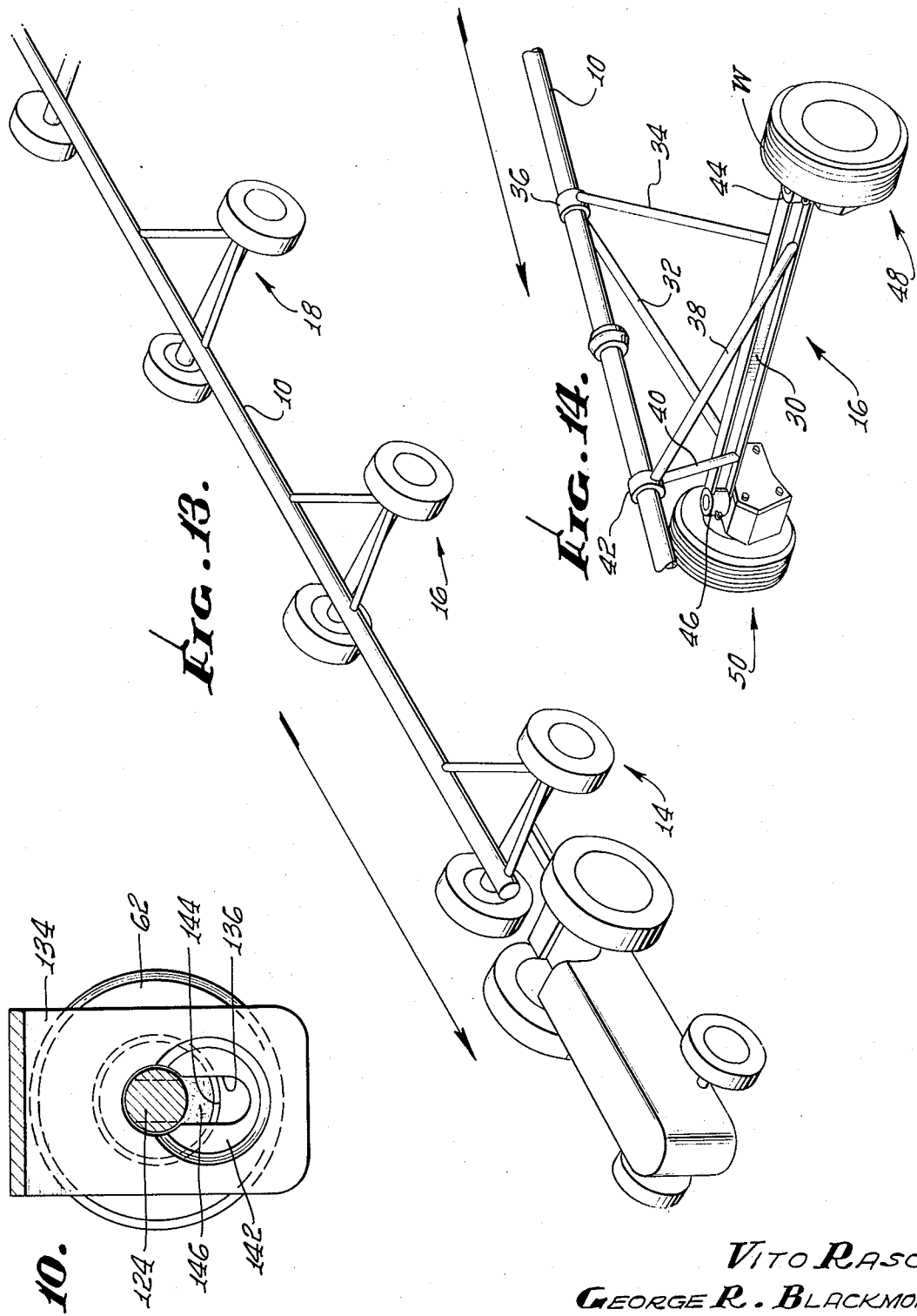

WHEEL MODULES FOR OVERHEAD TRACKING SPRINKLER SYSTEM

BACKGROUND OF THE INVENTION

1. Field of the Invention

This invention relates to ground tracking units for overhead sprinkler systems.

2. Discussion of the Prior Art

Overhead tracking sprinkler systems are finding increased favor. Such systems typically incorporate a pipe string supported by a series of ground tracking units spaced from each other perhaps by 100 feet. Each unit has a pair of tandem wheels. Each typical prior art ground tracking unit includes a gear motor and a pair of chain and sprocket mechanisms providing drive connections to the individual wheels. If the terrain is quite level and if there is no substantial danger of traction being lost, power may be applied to only one of the wheels while the other coasts.

In a rectangular array, the entire pipe string sweeps back and forth over a rectangular area in a direction at right angles to the string. In a circular array, a center is defined near one end of the pipe string. In both cases, one ground tracking unit is the lead unit operating at a set but preferably adjustable rate and the other ground tracking units follow by intermittent operation to keep in proper step.

To avoid downhill runaway, the gear mechanisms are designed to prevent reverse rotation. To permit towing, it has been common to disconnect the chains from their sprockets. Disconnecting the chains from their sprockets is also required if the wheel supports are to be turned to allow endwise towing.

Connecting and disconnecting sprocket chains is tedious. Sprocket chains in time become rusted; they are readily fouled. Periodic maintenance is required. Sprockets must be attached to the wheel spindles in some preconceived manner. As a result, each manufacture of overhead tracking sprinkler systems has its own wheel spindle design. Lack of standardization complicates maintenance. Moreover, the business of manufacturers of overhead tracking sprinkler systems is fluid handling, not vehicle drive systems.

BRIEF SUMMARY OF INVENTION

The primary object of this invention is to provide a new and improved modular drive system for overhead tracking sprinklers. The inventive modular drive systems make possible important results: (1) maintenance of the sprinkler system as a whole is vastly simplified and improved; (2) manufacturers of sprinkler systems need not be concerned with the design and/or construction of drive systems or with the design and/or construction of wheel spindles. Another object of the present invention is to provide a modular drive system for an overhead tracking sprinkler system in which a right angle gear mechanism makes possible a simple tandem drive arrangement of companion wheel modules.

Another object of this invention is to provide a modular drive system of this character in which at least one of the two companion wheel modules incorporates a worm gear or other self-locking means for preventing reverse rotation. Accordingly, a separate brake mechanism need not be provided to prevent downhill runaway. A companion object is to provide a simple means for disconnecting the wheel spindle from the gear mechanism whereby towing is made possible.

Another object of this invention is to provide a modular drive system of this character in which, if desired, the coupling between each module and the frame part of the ground tracking unit is so constructed and arranged as to allow selective orientation of the wheel axis whereby endwise towing is made possible.

In order to accomplish the foregoing objects, we provide a gear box by which a wheel spindle is supported. If the unit is to be a coaster unit, there are no gears in the box. If the unit is to be a drive unit, a motor is mounted on the gear box and transmission units are appropriately mounted in the box. If the unit is to be a motorless reducer, a jack shaft connects similar substantially coaxial gear elements of two companion wheel modules. All of the gear boxes are connected in precisely the same manner to the frames of the ground tracking units.

A simple clutch mechanism disconnects the wheel spindle from the gear mechanism, there being an operating rod extending within the wheel spindle which is made hollow for this purpose.

In a specific embodiment of the invention a pin and sleeve arrangement connects the gear box to the frame of the ground unit whereby the entire module is readily shifted 90° for endwise towing.

BRIEF DESCRIPTION OF THE DRAWINGS

A detailed description of the invention will be made with reference to the accompanying drawings. These drawings, unless described as diagrammatic or unless otherwise indicated, are to scale.

FIGS. 4, 5, 6 and 7 are sectional views taken along planes corresponding to lines 4—4 and 5—5 of FIG. 2 and lines 6—6 and 7—7 of FIG. 3.

FIG. 8 is an enlarged axial sectional view of a typical module showing the quick-disconnect drive device.

FIG. 9 is a sectional view taken along a plan corresponding to line 9—9 of FIG. 8.

FIG. 10 (sheet 4) is an enlarged sectional view taken along a plane corresponding to line 10—10 of FIG. 8.

FIG. 11 is a fragmentary sectional view similar to FIG. 8 but showing the clutch parts in disengaged position.

FIG. 12 is an enlarged transverse sectional view taken along a plane corresponding to line 12—12 of FIG. 11.

FIG. 13 is a diagrammatic view illustrating the manner in which the sprinkler string may be transported.

FIG. 14 is a pictorial view of a typical vehicle unit positioned for transport.

DETAILED DESCRIPTION

The following detailed description is of the best presently contemplated mode of carrying out the invention.

This description is not to be taken in a limiting sense, but is made merely for the purpose of illustrating the general principles of the invention since the scope of the invention is best defined by the appended claims.

Figure 1:
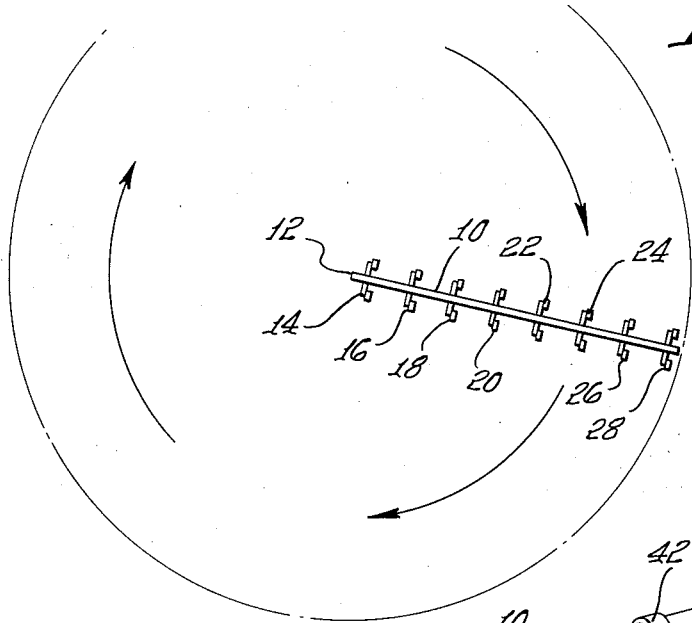
FIG. 1 is a diagrammatic plan view of an overhead sprinkler system of the circular sweep type.

FIG. 1 illustrates in plan, an overhead tracking sprinkler system comprising an elongated beam 10 that in this instance sweeps circularly about a center 13 located at one end of the beam. In the present instance, the sprinkler beam comprises a string of sprinkler pipe. The pipe itself need not form the sprinkler beam, but can be supported on a separate beam.

The beam is supported by a series of individual frames 14, 16, 18, 20, 22, 24, 26 and 28 spaced along the length of the beam. Each frame extends transversely and on opposite sides of the center of gravity of the beam. Two wheel modules are provided for each frame, one on one side of the beam and one on the other. The wheel modules are detachably secured to the frames. Each module includes a wheel spindle and, if not a coaster module, then according to requirements, a gear reduction mechanism and a motor or a gear reduction mechanism together with means for establishing a drive connection to the companion module.

One of the two wheel modules at one end of the beam (the outer end in the case of a radial array) is constantly driven by a variable speed drive thus to set the traverse rate of the entire sprinkler system. Other motorized wheel modules follow the lead of the end wheel module in such manner as to maintain proper alignment. This may be achieved, for example, by determining requisite ON times.

It is usually desirable that power be applied to both modules of the pair in order to ensure motive power even if traction is lost at one of the two wheels of the pair, which may be caused, for example, by mud holes or by uneven terrain that causes one wheel to leave the ground. It is also usually desirable to prevent coasting by connecting both wheels through rear reduction mechanisms to a single motor drive.

Figure 2:
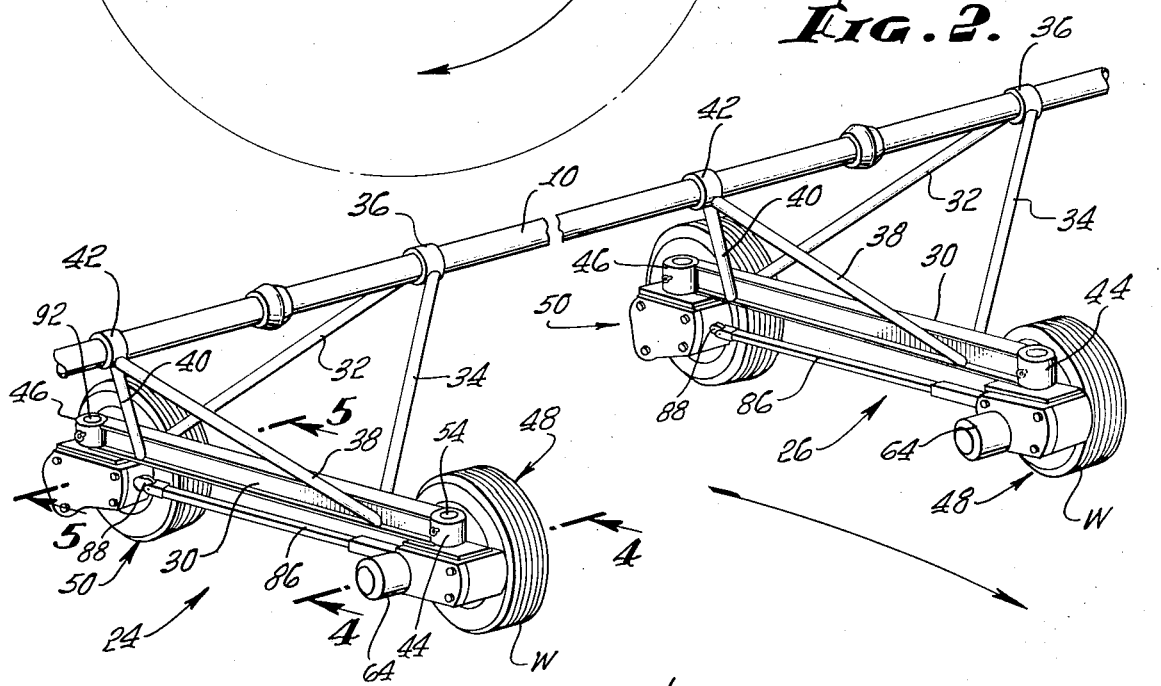
FIG. 2 is a fragmentary pictorial view of a section of the sprinkler string showing two ground tracking units, each unit incorporating a motor drive unit for one wheel, and a gear reduction unit for the other wheel, the gear reduction unit being driven by a jack shaft connection to the motor drive unit.
Figure 3:
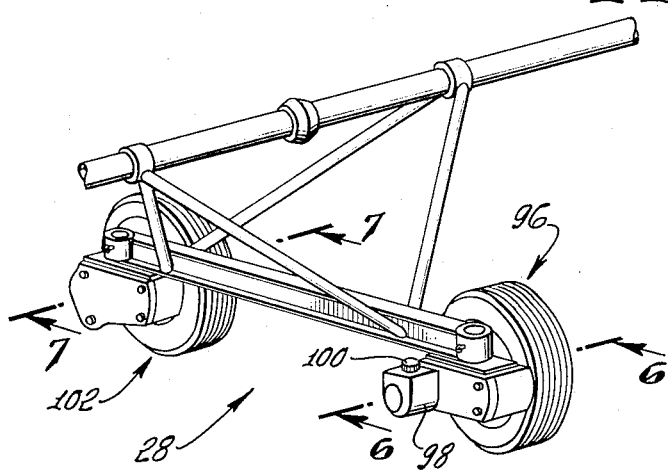
FIG. 3 is a fragmentary pictorial view showing the end ground tracking unit in which one of the wheels is driven by a variable speed drive mechanism.

Two intermediate ground tracking units 24 and 26 are shown in FIG. 2. Each unit includes a horizontal frame member 30 that extends transversely beneath the sprinkler string 10. A tetrahedral array of braces interconnect the string to the corresponding member. Thus, two braces 32 and 34 extend upwardly from spaced portions of the frame 30 to a common support collar 36 on the sprinkler string 10. Two braces 38 And 40 extend upwardly from spaced portions of the frame member 30 on the opposite side to another common support collar 42.

Opposite ends of the frame 30 in this instance have bases in the form of bearing bosses 44 and 46. The bosses are coupling members that rest upon wheel modules 48 and 50. The wheel module 48 (FIG. 4) includes a bearing box or transmission casing 52 that supports a wheel W. The casing 52 may be made in two parts, a hollow gear box part and a cover part suitably registered with each other. Projecting upwardly from and fastened to the top of the transmission casing, is a kingpin 54 received in the bearing boss 44. The kingpin 54 is held against rotation by a locking pin 56 whereby the wheel axis is located parallel to the string. A pair of bearings 58 and 60 within the casing 52 provide cantilever support to a wheel spindle 62 projecting through the front wall of the casing.

In the present instance, the wheel module 48 is motor driven. Accordingly, a motor 64 is detachably connected on the outside of the rear cover part of the gear casing. The motor operates a right angle gear transmission connected to the spindle 62. A worm 66 is directly driven by the motor and forms one element of the transmission. The worm 66 is parallel to the wheel spindle 62 but laterally offset therefrom. The worm engages a worm wheel 68 mounted upon a right angle stub shaft 70 located above the worm. The stub shaft 70 has its ends supported at the side walls of the transmission casing near the top of the gear casing. The stub shaft 70 carries a second worm 72 that engages a second worm wheel 74 mounted upon the wheel spindle 62. The stub shaft 70 by virtue of the arrangement of the right angle drive, extends parallel to the direction of movement of the unit 24. By intermittently operating the motor 64, the truck or vehicle unit keeps in step. The reduction gearing is self-locking and thus acts to brake the module if power is removed or if the unit tends to overrun.

The companion wheel module 50 for the ground tracking unit 24 has a gear case 76 (FIG. 5) substantially identical to the gear case 52. The gear case 76 mounts a wheel spindle 78 by the aid of bearings 80 and 82, all in a manner identical to the companion wheel module. The spindle 78, like the spindle 62, carries a worm wheel 84 identical to and driven in unison with the worm wheel 74. For this purpose, a jack shaft 86 (FIG. 2) joins an outboard extension of the stub shaft 70 of the first wheel module to a similar outboard extension of a stub shaft 88 of the second wheel module. This simple connection is made possible due to the right angle nature of the drive whereby corresponding rotary elements of tandem wheel modules are nominally coaxial. The stub shaft 88, like the stub shaft 70, mounts a worm 90 that engages the worm wheel 84. Accordingly, the motor 64, attached only to one wheel module, drives both. The jack shaft 86 may be connected to the stub shaft extensions by suitable clevis or other quick-disconnect structures. Preferably the connections allow for certain flexure of between the companion wheel modules. Since the stub shafts 90 and 88 are above the worm 66 and spindle 62, the danger of the jack shaft interfering with the ground is minimized.

The case 76 carries a kingpin 92 received in the bearing boss 46 to support the other end of the frame 30. A locking pin 94 holds the kingpin 92 against rotation.

FIGS. 6 and 7 show wheel module structures for the end framework unit 28. One wheel module 96 is identical to the wheel module 48, except that the drive motor 98 incorporates a variable speed mechanism the ratio of which is determined by a knob 100.

The wheel module 102 for the other end of the framework unit 28 is a coaster unit. It includes a casing 104 substantially identical to the casings 52 and 76. Bearings 108 and 110 support a simple wheel spindle 112.

The modules shown in FIGS. 4, 5, 6 and 7 can be used in any appropriate combinations. A motorized wheel module can be used with a coaster unit or with a power take-off wheel module. The casings used for all modules are provided with appropriate registers for mounting of motors and appropriate bosses that may be machined to accommodate bearings for the worms and stub shafts. A totally versatile arrangement is thus provided.

The sprinkler string is best moved to another field by endwise towing and as indicated diagrammatically in FIG. 13. This requires the wheel axes to be turned 90°. The modules 96 and 102 are easily turned simply by removing the locking pins for the kingpins and rotating the kingpins 90°, and thereupon reinserting the locking pins. In order to turn the interconnected modules, such as the modules 48 and 50, the jack shaft 86 must first be disconnected, whereupon the kingpins of the units can be relocated. If endwise towing is not required, a simpler method may be used for attaching the gear casings to the frames of the ground tracking units. For example, the frames may provide flanges directly bolted to the gear boxes.

The gear mechanisms of all but the coaster modules will normally lock and prevent wheel rotation as the string is towed. To disconnect the spindles from their gear mechanisms, a simple clutch is provided as shown in FIGS. 8 through 12.

As shown in FIG. 8, the spindle 62 is connected to the hub of the worm gear 74 by the aid of clutch plate 114. The clutch plate 114 is rotatably coupled to the spindle 62 by the aid of a key or spline 116 which allows the clutch plate to slide axially. The clutch plate 114 on its inner face has a set of clutch teeth 118 cooperable with a companion set of clutch teeth 120 formed on the face of the hub of the worm 74. UPon movement of the clutch plate 114 outwardly, the worm 74 is disengaged and the spindle 62 is free wheeling. However, the clutch plate 114 is normally urged inwardly into engagement by the aid of a compression spring 122.

In order to retract the clutch plate 114, an operating rod 124 is provided. The rod is slidably accommodated in an elongated bore 126 of the spindle. The outer end of the operating rod mounts an eye-bracket 128 by the aid of which the rod 124 may be manipulated. The inner end of the rod 124 is connected to the clutch plate 114 by the aid of a cross bar 130 (see also FIG. 9). The spindle has a large transverse aperture 132 providing adequate clearance for shifting movement of the cross bar 130. The operating rod 124 may be held in the released or free wheeling position of FIG. 11 by the aid of a locking pawl 134 located at the outer end of the spindle. The pawl has a keyhole slot 136 through which the operating rod 124 extends and is held from moving off the rod by the enlarged shank 138 of the eye-bracket. The cross bar 130 itself could be used as an element of the clutch mechanism in which case the face of the worm 74 would provide a simple cross slot for entry of the rod. The operating rod may be accessible at either end of the spindle.

In the engaged position of the clutch plate (FIG. 8) the pawl is idle. When the rod 124 is pulled out (FIG. 11), two flats 140 (see also FIG. 12) on the rod 124 are in position at the end of the spindle to be interlocked by the small end of the keyhole recess 136 of the pawl. The clutch spring 122 tends to pull the rod back; however, the pawl 134 now engages the end of the spindle to prevent this. The pawl 134 is dished as at 142 in order to seat in the enlarged outer end 144 of the bore 126. The seating of the pawl prevents accidental release of the rod.

The clutches are easily returned to engaged position after the string has been towed. Wheels are easily returned to tandem relationship.

All of the clutch parts, except the bracket 128 and pawl 134, are inside the gear box and thus protected from mud, water, etc. A seal 146 located at the bottom of the enlarged bore portion 144 surrounds the rod and limits entry of foreign materials.

Intending to claim all novel, useful an unobvious features shown or described, we make the following claims:

1. In an overhead tracking sprinkler system:
   a. a sprinkler beam selectively movable in a defined path transverse to the beam;
   b. a series of individual ground tracking units spaced along the beam, each of the units including a frame extending on opposite sides of the center of gravity of the beam; each ground tracking unit including a pair of tandem wheel modules; each wheel module of some of the ground tracking units having
      i. a bearing box having means detachably connected to the corresponding frame to support the frame and to lock the bearing box against angular movement about a vertical axis;
      ii. a wheel spindle supported by bearings mounted by the box; and
      iii. transmission members in said bearing box;
   c. a motor for one of the wheel modules of each of said some ground tracking units and supported on the corresponding bearing box; and
   d. shaft means interconnecting the motorized wheel modules with the companion wheel module for powering the wheel modules in pairs by a common motor.

2. In an overhead sprinkler system:
   a. a sprinkler beam selectively movable in a circular path about a center fixed with respect to the beam;
   b. a series of individual ground tracking units spaced along the beam, each unit having a pair of coupling members spaced from each other and located on opposite sides of the center of gravity of the beam;
   c. a pair of wheel modules for each of the frame members, each wheel module having
      i. a bearing box having means interfitting the corresponding coupling members to form a support for the frame member and to lock the bearing box against angular movement about a vertical axis,
      ii. a wheel spindle supported by bearings mounted on the box;
   d. said interfitting means and said coupling members being adjustable to determine alternate axis orientation of said spindles in one of which said axes are substantially parallel to said sprinkler beam for angular tracking movement of said sprinkler beam, and in the other of which said axes extend substantially at right angles to said beam for endwise towing of said beam;
   e. one of each pair of wheel modules having a gear reduction mechanism mounted in its bearing box and connected to the corresponding spindle;
   f. said motor being attached to the corresponding bearing box independently of the corresponding frame;
   g. some of the other said pairs of wheel modules having a gear reduction mechanism mounted in its bearing box and connected to the corresponding spindle; and
   h. a jack shaft interconnecting corresponding parts of the transmission mechanisms of the companion wheel modules whereby both wheel modules are powered by a common motor.

3. The combination as set forth in claim 2 together with quick-disconnect clutch mechanisms for freeing the wheel spindles of those wheel modules provided with gear reduction mechanisms to permit coasting thereof for towing purposes.

4. In an overhead tracking sprinkler system:
   a. a sprinkler beam selectively movable in a defined path transverse to the beam;
   b. a series of individual ground tracking units spaced along the beam, each of the units including a frame extending on opposite sides of the center of gravity of the beam; each ground tracking unit including a pair of tandem wheel modules; each wheel module of some of the ground tracking units having
      i. a bearing box having means detachably connected to the corresponding frame to support the frame and to lock the bearing box against angular movement about a vertical axis;
      ii. a wheel spindle supported by bearings mounted by the box; and
      iii. transmission members in said bearing box including a rotary element having a substantially horizontal axis orientation extending substantially parallel to the direction of traverse of said sprinkler beam;
   c. a motor for one of the wheel modules of each of said some ground tracking units and supported on the corresponding bearing box; and
   d. the said rotary elements of companion tandem wheel modules being substantially coaxial, there being a jack shaft interconnecting said corresponding rotary elements of tandem wheel modules.

5. A wheel module for use with an overhead tracking sprinkler system having a sprinkler beam selectively movable in a circular path about a center fixed with respect to the beam, and having a supporting frame providing a series of bases located on both sides of the center of gravity of the beam and located in spaced relationship along the length of the beam, including:
   a. a bearing box;
   b. a coupling member on the box detachably cooperable with any one of said bases to support said base and to hold the bearing box against angular movement about a vertical axis;
   c. a wheel spindle supported by bearings mounted in the box;
   d. said coupling member and said base being relatively adjustable to determine alternate axis orientation of said spindle in one of which said axes is substantially parallel to said sprinkler beam for angular tracking movement thereof, and in the other of which said axes extends substantially at right angles to said beam for endwise towing thereof;
   e. a stub shaft having an axis extending in a plane perpendicular to the axis of said spindle;
   f. a pair of gear elements carried by said stub shaft, one being cooperable with the motor mounted on the box for rotating the stub shaft, and the other being cooperable with a companion gear element carried on said spindle; and
   g. a jack shaft for connecting said stub shaft to the aligned stub shaft of a like wheel module located on the opposite side of the sprinkler beam.

6. In an overhead tracking sprinkler system:
   a. a sprinkler beam selectively movable in a defined path transverse to the beam;
   b. a series of individual ground tracking units spaced along the beam, each of the units including a frame extending transversely on opposite sides of the center of gravity of the beam; each ground tracking unit including a pair of generally tandem wheel modules; each module having
      i. a bearing box having means detachably connected to the corresponding frame and supporting the frame; and
      ii. a wheel spindle supported by bearings mounted by the box;
   one of the wheel modules of some of the ground tracking units including a motor carried by the bearing box for moving the corresponding wheel spindle to impart movement of said beam in its path, some of said wheel modules including gear reduction mechanisms of the self-locking type; and
   c. quick-disconnect clutch means between the gear reduction mechanisms and the corresponding wheel spindles for freeing the wheel spindles of those modules provided with gear reduction mechanisms.

7. The combination as set forth in claim 6 in which the motor is detachably mounted on the outside of the corresponding gear box.

8. The combination as set forth in claim 6 in which said clutch means is located internally of said box and in which said clutch means has an externally accessible actuator.

9. The combination as set forth in claim 6 in which each of said gear reduction mechanisms includes a gear element for the corresponding spindle; said quick-disconnect clutch means including an axially separable coupling between the spindle and said gear element, spring means normally urging said axially separable coupling into engaged position and an operating rod extending through a bore in the spindle and having one end accessible at the outer end of the spindle, and having its other end connected to said coupling for causing said coupling to be disengaged upon axial movement of said operating rod against the force of said spring means; and a locking mechanism for releasably holding said operating rod in coupling disengaged position.

10. The combination as set forth in claim 9 in which said locking mechanism comprises a locking key or pawl located at the outer end of said rod and retained on the end of said rod by a stop on said rod, said key having a slot movable to engage grooves on opposite sides of said rod upon transverse movement of said key or pawl when said grooves are moved into longitudinal alignment with the end of said spindle whereby the interference between said pawl or key and the end of said spindle holds said rod in coupling disengaged position.

11. The combination as set forth in claim 10 in which the end of said spindle has an enlarged recess through which said rod extends, said key or pawl having a dished portion positioned to seat at the end of said recess when coupled to said rod whereby said pawl or key is protected from accidental dislodgment from said rod.

* * * * *